Patented Aug. 11, 1925.

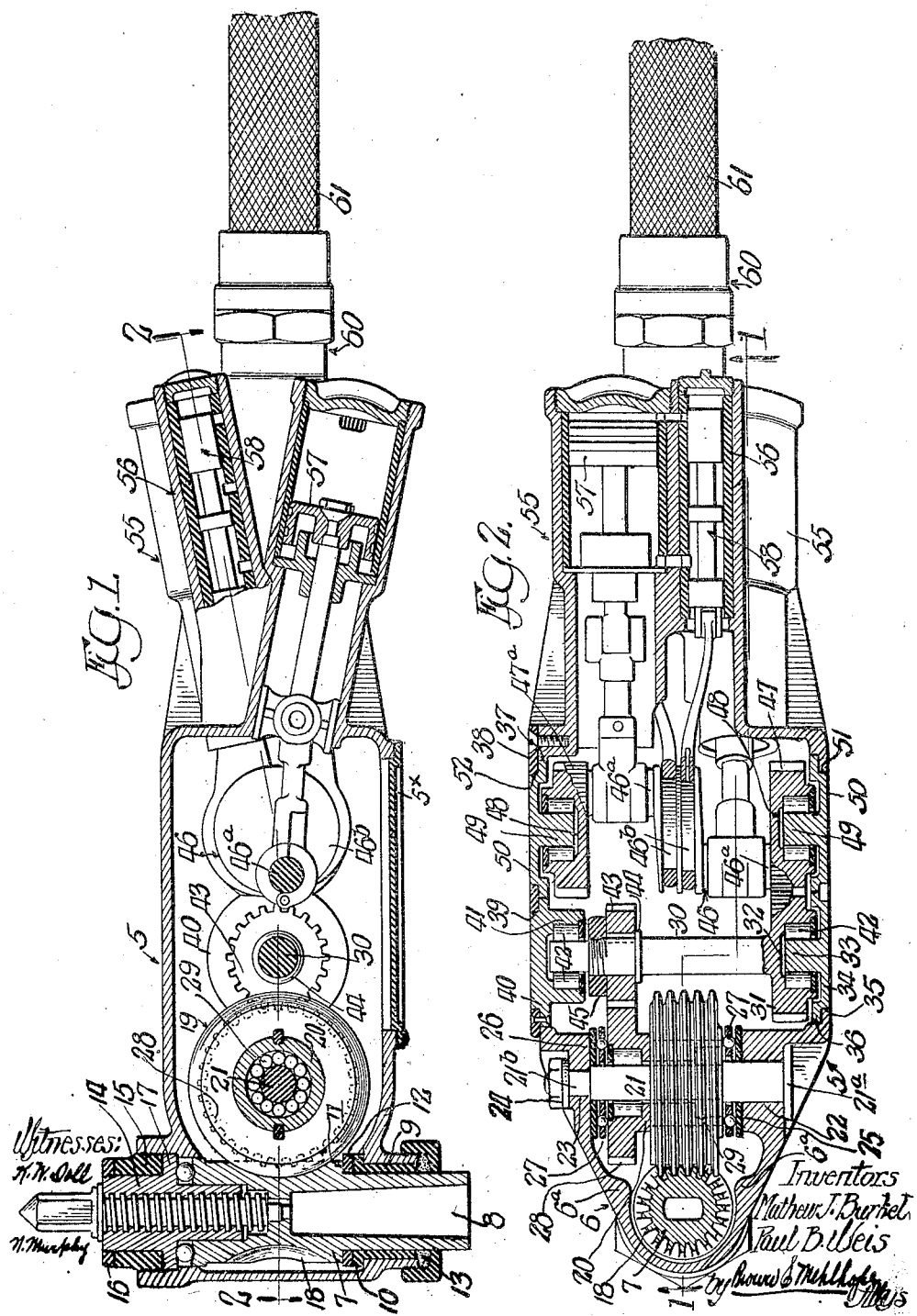

1,548,822

UNITED STATES PATENT OFFICE.

MATHEW J. BURKEL AND PAUL B. WEIS, OF AURORA, ILLINOIS, ASSIGNORS TO CLARENCE E. MELHOPE, TRUSTEE, OF WINNETKA, ILLINOIS.

GEARING FOR DRILLING MACHINES.

Original application filed May 17, 1916, Serial No. 98,017. Divided and this application filed December 30, 1916, Serial No. 139,811. Renewed March 18, 1920. Serial No. 367,000.

*To all whom it may concern:*

Be it known that we, MATHEW J. BURKEL and PAUL B. WEIS, citizens of the United States, and residents of Aurora, in the county of Kane and State of Illinois, have invented certain new and useful Improvements in Gearing for Drilling Machines; and we do hereby declare that the following is a full, clear, and exact description thereof, reference being had to the accompanying drawings and to the letters of reference marked thereon, which form a part of this specification.

This invention relates to improvements in gearing for drilling machines and consists of the matters hereinafter described and more particularly pointed out in the appended claims.

The present application is a divisional application, the matter herein having been first presented in an application filed by us on May 17, 1916, Serial No. 98,017. The object and the many advantages of the invention will appear as we proceed with our specification.

In the drawings:

Figure 1 is a view representing a longitudinal section through a drilling machine provided with out improved gearing, in a plane indicated by the line 1—1 of Figure 2.

Figure 2 is a view representing a longitudinal section through the drilling machine in a plane at right angles to the section shown in Figure 1 as indicated by the angular line 2—2 of Figure 1.

Referring now to that embodiment of our invention illustrated in the drawings, 5 indicates a hollow shell or casing which constitutes the body of a drilling machine containing the improved gearing. This shell is substantially rectangular in cross section but is tapered on two sides toward the spindle end 6 as indicated in Figure 2. 7 indicates a spindle which has bearing in the end of the casing and has the familiar socket 8 to receive the shank of a drill. The spindle 7 is mounted close to the end wall 6 of the casing which is made concentric with the rotary axis of the said spindle.

A sleeve 9, fixed in a suitable socket in the bottom wall of the casing provides rotative bearing for the lower length of the spindle and a radial flange 10 at the top of said sleeve provides a thrust bearing for a radial shoulder 11 on the spindle 7, a washer 12 being interposed between the two. A stuffing box 13 is provided to close the bearing opening in the shell about the bottom end of the spindle. The upper end of the spindle has rotative bearing in a socket formed in the top of the shell and has thrust bearing against a head or plug 14. Said plug is retained in the shell by means of a ring 15, which is threaded into the top of said socket and surrounds the upper end of the plug.

A jam nut 16 is threaded upon the upper end of the plug to lock the ring 15 in place. As shown, the top of the spindle is provided with a bearing aperture or recess into which the bottom end of the plug 14 extends, thus providing a bearing for the top of the spindle. A radial shoulder 17 provides an end thrust for the top end of the spindle, antifriction balls being interposed between the two.

The intermediate length of the spindle 7 is provided with longitudinal teeth 18. Said teeth are engaged by a worm 19 mounted near the end of the casing with its axis at right angles to the axis of the spindle and to the axis of the casing. The said worm is of considerably greater diameter than the gear provided by the teeth 18, on the spindle and the threads of the worm, approximate a right angle to the rotative axis of the worm. By this construction a maximum of torque is imparted to the spindle to drive the tool. As will be manifest the worm and gear may be of multiple or of single thread as required. As shown in the drawing the thread is single. The gear teeth 18 on the spindle are cut inwardly in an arc, of the radius of the worm so that the worm may engage a maximum number of said teeth.

The side walls of the casing are strengthened in the vicinity of the spindle by vertically extending internal ribs $6^a$, $6^a$ which merge or disappear transversely into the curved end wall 6. This construction obviates the necessity for the usual external strengthening rib and, as but little clearance is required between the spindle and the end wall of the casing, it is possible to more closely approach the axis of the spindle to fixed parts in the neighborhood of the hole that is to be drilled.

The worm 19 is mounted on a sleeve 20 to which it is keyed and said sleeve in turn, is rotatively mounted on a shaft 21 that extends transversely through the casing 5. Said casing is provided with suitable openings 22, 23 in its side walls to receive the shaft which in assembling the drilling machine, is inserted through the opening 22 at one side, its movement therethrough being limited by means of a head 21$^a$. The other end of the shaft, namely the end 21$^b$ is reduced in diameter and extends through the opening 23, beyond which it is engaged and locked in place by means of a nut and washer 24. The inside wall of the casing 5 is formed to provide thrust shoulders 25, 26 about the shaft 21 and between these and the ends of the sleeve 20 are interposed suitable antifriction bearing devices 27, 27. At one end of the sleeve 20 is formed an integral spur gear 28. Roller bearings 29, 29 are provided at the ends of the sleeve between said sleeve and the shaft 21.

A second transverse shaft 30 is mounted in the casing near the first named shaft 21 and in parallel relation thereto. Said shaft 30 has a spur gear 31 made integral with it at one and is provided with a recess 32 at that end, which bears upon a stud 33, extending inwardly from the side wall of the casing. The stud 33 is formed on a disc 34, which is fixed in a suitable hole or opening 35 in the casing wall. Said disc has a flange 36 which is spaced inwardly from its outer face and which engages against the inside wall of the casing about said hole, the outer face of the disc being flush with the outside surface of the side wall of the casing.

On the opposite side of the casing is a large hand hole or opening 37 which is closed by a plate 38 screwed to the casing. Said plate is provided with an opening 39, similar to the opening 35 in the opposite wall of the casing and in said opening is engaged a flanged disc 40, which is like the disc 34 except that it has a recessed boss 41 extending into the casing to provide a bearing for the end of the shaft 30. Suitable roller bearings 42 are provided between the shaft and the bearing stud 33 on the one hand and the recessed bearing boss 40 on the other hand.

A spur gear 43 is fixed on the shaft 30 between an integral radial shoulder 44 and a nut 45 threaded upon the shaft near its end, the bearing end of the shaft being reduced in diameter to permit said nut to be slipped beyond it. Said spur gear 43 engages the spur gear 28 which, as has been described, is non-rotatively connected to the worm 19.

Near the shaft 30 and arranged parallel thereto and in the plane of the shafts 21 and 30, there is mounted a crank shaft 46. The bearing ends of said shaft are formed to provide spur gears 47, 47$^a$ which are made coaxial with the rotative axis of said shaft. Said gears have bearing recesses 48 in their outer surfaces, which are engaged by studs 49, 49 fixed in the side walls of the casing. The studs 49, 49 are made integral with flanged discs 50, 50 one of which is engaged in an aperture 51 in the side wall of the casing and the other of which is engaged in an aperture 52 in the plate 38 that closes the hand hole 37 on the opposite side of the casing. Said discs are similar in their construction and in the manner of their engagement within their respective openings to the disc 34 already described. Suitable roller bearing are interposed between said gears 47, 47$^a$ and their associated bearing studs 49.

The gear 47 on the crank shaft 46 engages the gear 31 on the shaft 30. The other gear 47$^a$ on said crank shaft is normally an idle gear; but in case the active gear 47 is broken it is only necessary to reverse the crank shaft end for end and bring the gear 47$^a$ into the place formerly occupied by the gear 47.

From the construction thus far described, it will be apparent that the rotation of the crank shaft, through the gears 47, 31, imparts rotative movement to the shaft 30, which in turn through the gears 43 and 28 imparts rotative movement to the worm 19 so as to drive the spindle.

The bottom wall of the casing has a hand hole which is closed by a plate 5$^x$ (see Figure 1). This hole provides for the inspection of the gearing in the casing, after it has been assembled, and also for packing the casing with grease.

The crank shaft 46, in the application of the gearing shown herein, is driven by means of a two cylinder reciprocating pneumatic motor or engine which is mounted in the rear end of the casing 5. The cylinders of the engine are made as shown, integral with the casing, and are arranged in planes extending at an acute angle to each other and intersecting in the rotative axis of the crank shaft. 55 indicates the cylinders of said motor, and 56 indicates the associated valve chests. Within each cylinder is a piston 57 which is operatively connected to an associated crank arm 46$^a$ of the crank shaft. Within each valve chest 56 is a reciprocating piston valve 58 which is operatively connected to an eccentric 46$^b$ made integral with the crank shaft, between the crank arms 46$^a$.

Pneumatic fluid under pressure is admitted to said cylinders and valve chests, through a handle extension 60 and upon said extension is mounted a throttle valve controlling sleeve 61 for controlling the admission of the pneumatic fluid and for changing the course of said fluid so that the rotation of the crank shaft 46 may be reversed at the will of the operator.

As has been pointed out, the use of the worm of larger diameter in connection with the gear on the spindle of comparatively smaller diameter, together with the arrangement of the teeth of the worm and of the gear so that the former extend at right angles to the axis of the worm, provides for a very powerful drive and raises the efficiency of the drilling machine to a maximum. By the use of the worm drive also, the spindle may be effectively operated in either direction.

Another and primary advantage of the improved gearing results from the fact that the several gears in the casing may be easily and readily changed to suit different requirements without change of the casing or the body of the tool. Thus in the case of the drill body illustrated, to further increase the speed of the tool spindle, it would simply be necessary to substitute a worm with a multiple thread instead of a single thread shown therein and change the spindle to one having teeth to be engaged by said worm. Again, the speed of the spindle for the same body may be varied by changes in the gears 28 and 43. Thus the varied requirements that might be met in a single body will be apparent to those familiar with the art.

By reason of the fact that the worm teeth are substantially at right angles to the axis of the worm it will be manifest that the drill may be used as a wrench or extractor for removing the tool from the hole cut after the tool has been driven as far as desired.

We claim as our invention:

1. In a drilling machine in combination with a casing, a spindle rotatively mounted at one end of said casing, said spindle being provided with gear teeth substantially parallel to its axis, a shaft detachably fixed in said casing and extending at right angles to said spindle and a sleeve provided with an integral gear mounted on said shaft, a worm fixed on said sleeve and engaged with the spindle gear, a second shaft extending parallel to said first named shaft rotatively mounted in said casing, a removable gear on said shaft engaged with the gear on said sleeve, a crank shaft rotatively mounted in said casing with its axis parallel to said first and second named shafts and gearing intermediate said crank shaft and said second named shaft for driving said second named shaft in either direction.

2. In a drilling machine in combination with a casing, a spindle rotatively mounted at one end of said casing, said spindle being provided with gear teeth substantially parallel to its axis, a shaft detachably fixed in said casing and extending at right angles to said spindle, a sleeve provided with an integral gear mounted on said shaft, a worm fixed on said sleeve and engaged with the spindle gear, a second shaft extending parallel to said first named shaft and rotatively mounted in said casing, a removable gear on one end of said shaft and engaged with the gear on said sleeve, a second gear made integral with the other end of said second named shaft, a crank shaft provided at its ends with integral gears, one of said crank shaft gears meshing with the gear integral on said second shaft, and means in said casing providing bearing for said crank shaft whereby said crank shaft may be reversed (end for end).

3. In a drilling machine in combination with a casing, a spindle rotatively mounted at one end of said casing, said spindle being provided with gear teeth substantially parallel to its axis, a shaft detachably fixed in said casing and extending at right angles to said spindle and a sleeve provided with an integral gear mounted on said shaft, a worm fixed on said sleeve and engaged with the spindle gear, a second shaft extending parallel to said first named shaft rotatively mounted in said casing, said second shaft being provided at one end with an integral gear having a bearing aperture and having near its other end a gear removably fixed to it which is engaged with the gear on said sleeve and a removable crank shaft rotatively mounted in said casing with its axis parallel to said first two named shafts, said crank shaft being provided with a gear in mesh with the integral gear on said second shaft.

In testimony that we claim the foregoing as our invention we affix our signatures in the presence of two witnesses, this 16th day of November, A. D. 1916.

MATHEW J. BURKEL,
PAUL B. WEIS.

Witnesses:
Louis P. Fosnot,
Peter L. Kreitz.